(No Model.)
2 Sheets—Sheet 1.
J. A. CURRIE.
CEREAL FOOD AND PROCESS OF PRODUCING THE SAME.
No. 460,320.                    Patented Sept. 29, 1891.
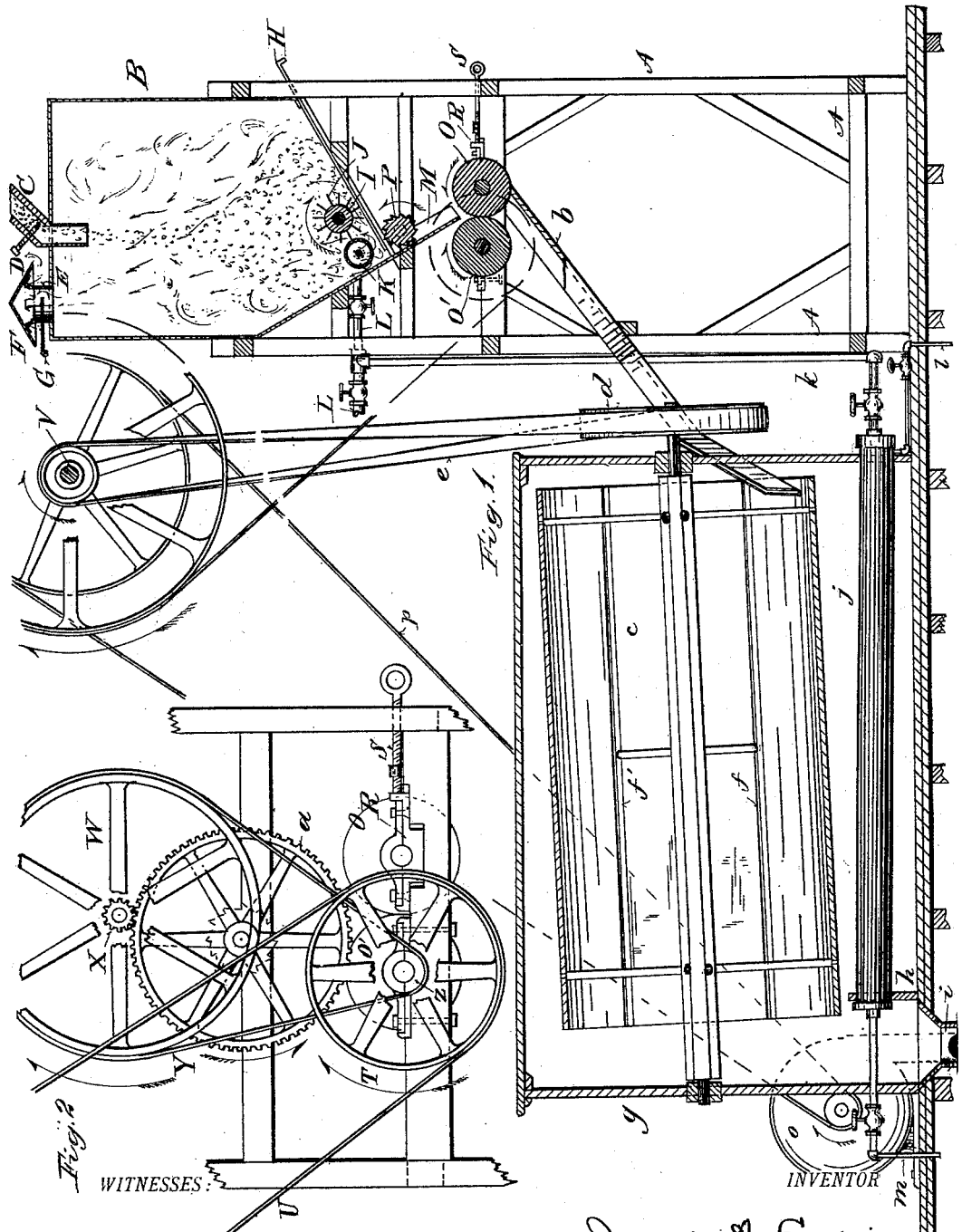
WITNESSES:
H. M. Plaisted.
J. C. Dawley.
INVENTOR
James A. Currie,
BY
HIS ATTORNEY.

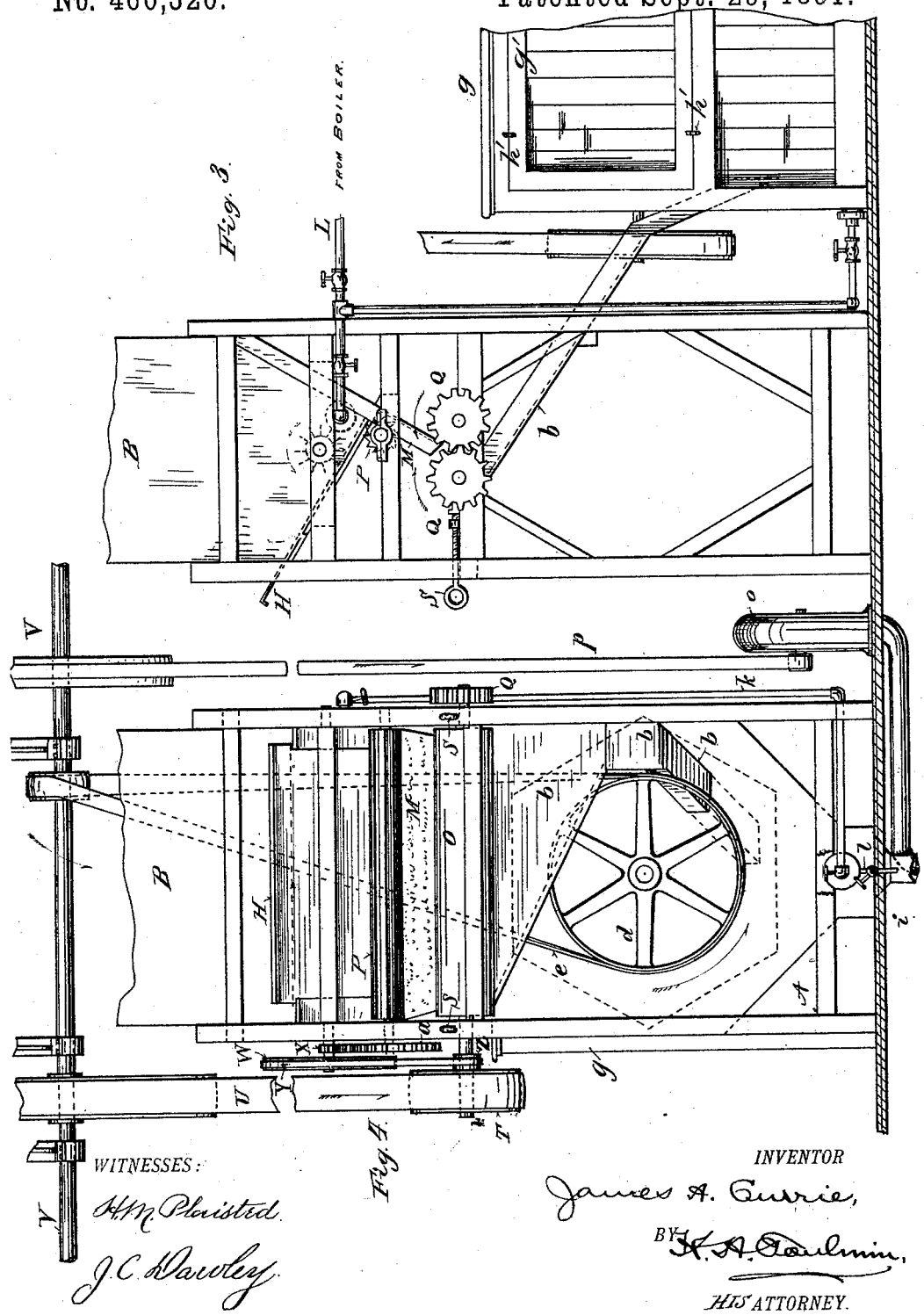

UNITED STATES PATENT OFFICE.

JAMES A. CURRIE, OF SPRINGFIELD, OHIO.

CEREAL FOOD AND PROCESS OF PRODUCING THE SAME.

SPECIFICATION forming part of Letters Patent No. 460,320, dated September 29, 1891.

Application filed March 14, 1891. Serial No. 385,029. (No model.)

*To all whom it may concern:*

Be it known that I, JAMES A. CURRIE, a citizen of the United States, residing at Springfield, in the county of Clark and State of Ohio, have invented certain new and useful Improvements in Cereal Food and Processes of Producing the Same, of which the following is a specification, reference being had therein to the accompanying drawings.

This invention relates, first, to a combined cereal food composed of Indian corn or maize and of rice, and, secondly, to an improved art or process of manufacturing and producing the said combined cereal food.

I will describe the combined food and the process or art by which it is made, treating the two together as the most convenient way of disclosing the same. I first take Indian corn or maize and hull and degerminate it by any of the usual and well-known methods, and then granulate it until the kernels become reduced to pieces about half the size of a grain of rice. I then take rice and reduce, divide, or cut the grains into two pieces of about equal size—what may be called "halving" the grains. The corn or maize so reduced and the rice so reduced are then mixed in such proportions as may suit the taste or suit the preference of the particular market in which the product is to be sold. I recommend the proportions of one-fourth rice and three-fourths corn to one-half rice and one-half corn. This combined cereal I then place in a receptacle and subject it to the action of steam, preferably live steam, until the corn and rice composing it are softened or toughened and reach a gelatinized state to form dextrine of the starch properties of the cereals, rendering it wholesome and easily digestible. This action of steam is maintained from ten to fifteen minutes, by which time the particles of corn and rice will have become so pliable that they will be capable of being rolled into flake form without crumbling or granulating by the mechanical action of rolling them. I prefer to arrange for the free exit of the steam from the steaming-vessel, so as to prevent the rice ingredient from becoming sticky and mushy. I have found that by freeing the vessel of the steam as it passes through and above the material and thus preventing the accumulation of condensation and promoting a sort of evaporating action or process, so as to avail myself of the cooking and softening qualities of the moist heat while eliminating the moisture, I obtain a practically new rice ingredient, which is capable of being flaked by being passed between rolls, yet without adhering to the rolls. After the combined cereal is thus treated it is subjected to the action of means for flattening the individual particles or pieces, so that they may be made into flake form. This done, they will be of comparatively uniform size, and will present a translucent appearance. The product is next treated by means to dry it and rapidly absorb the slight moisture present in the individual pieces. I prefer to use hot air or a chamber in which the temperature is raised sufficiently to rapidly dry the product. When the product is discharged from the drying apparatus, I prefer to further subject it to a cooling action, as that of air-blasts, whereby the heat due to its having been steamed and partially cooked is absorbed and the article rendered ready for packing and shipment. Thus my product consists of combined cereals, the cheapness of the corn rendering it possible to produce the article at prices low enough to meet commercial demands, and the rice giving it the flavor and quality desired by persons fond of rice. The rice predominates in flavor and appearance after the food is cooked the short while required to prepare it for table use. This is believed to result from the peculiar treatment the corn and rice receive while in the combined state under the process herein set forth. Thus a food is produced wherein the rice flavor and appearance predominates, though that ingredient is less or only equal to the other ingredient, and wherein the corn flavor still exists, and wherein a more economical ingredient supplies much of the bulk, while the more expensive ingredient, by the peculiar joint treatment they receive, supplies the main flavor. Rice is much more expensive than corn, and one of the main objects of this food is to supply the rice flavor, yet actually use less rice or not any more rice than corn. The product herein answers this end, yet it is cheaper than the same quantity of food composed of rice alone. Thus a novel and peculiar union of the two ingredients is effected by the new and peculiar effects of the process herein described. Thus the individuality of the broken rice grains is preserved, as distinguished from reducing the rice to a granular state. The partial cooking of the cereals by the action of the steam renders the food capable of being prepared for the table in from ten to twenty minutes, while the corn alone, if merely reduced to hominy according to the old way, would require about six hours and the rice about two hours. The product has a delicious flavor, while the nutritive properties of both the cereals are preserved. The per cent. of fat and starch contained in the ingredient of this combined cereal food gives it a very high degree of nutriment, the rice having the highest per cent. of starch of any cereal known (about 78.8 per cent.) and the maize about 64.5 per cent. Again, both ingredients contain more phosphoric acid than any other cereal or combination of cereals known to me. From a physiological and chemical standpoint based upon these facts, it will be seen that this food is a valuable one. Furthermore, in fat maize leads all the cereals in the per cent. it contains. Thus the high per cent. of nourishment contained in this mixture and its intrinsic value as a food will be understood. The action of the process is such as to prevent the rice as well as the corn ingredient from fermenting or souring in warm and damp climates.

Referring now to one form or type of apparatus by which my process may be practiced, Figure 1 represents a vertical sectional view of the apparatus employed in treating the cereals after their proper reduction in size, some of the parts being shown in elevation; Fig. 2, a side elevation of a part of the frame and of the wheels, gears, and pulleys entering into the organization of the machine; Fig. 3, a side elevation of a portion of the apparatus; and Fig. 4 an end elevation composed of the hopper, rolls, &c.

In a suitable frame composed of timbers A, I mount a steaming-vessel B, of sheet metal. The cereals are fed into this vessel from a suitable source through a conduit C, having a cut-off D to regulate the supply. The upper part of this vessel is provided with a steam exit or escape composed preferably of a chimney E, having a cap F and a slide G, by which the rapidity of the emission is controlled. At the lower end of the vessel is a slide H, which controls the outflow of the cereals. In the lower part is mounted a roll I, having spurs or pins J, which, when rotated, act to prevent the cereals from massing and clogging in the vessel and operate to effect a ready feed of the cereals from the vessel. This roll is rotated by means presently to appear. Also mounted in the vessel and at the lower part is a transverse steam-diffusing pipe K, perforated in the lower portion, as indicated by the arrows, and adapted to supply steam to the mass of cereals incumbent upon the pipe and in the vessel. This pipe connects with a source of steam-supply, as a steam-boiler, (not shown,) by a pipe L. A chute M extends from the vessel B, so as to deliver the cereals to the flaking-rolls O and O'. A fluted or corrugated roll P, located near the opening in the bottom of the vessel, acts to feed the cereals regularly down the chute. This roll receives rotary motion in the manner presently to appear. The flaking-rolls O and O' are geared together by gears Q of equal diameter, so that the rolls will rotate at a uniform speed. The journals of one of the rolls are mounted in an adjustable box R, manipulated by the screw-threaded rods S, to effect an adjustment between the rolls as to press the broken grains of cereals to the proper thinness. The shaft of the roller O' carries a pulley T, which receives motion from the belt U, operated from the line-shaft V. (See Figs. 1 and 2.) The roller I carries a belt-wheel W and a pinion X, the former receiving motion by a belt Y from a pulley Z on the shaft of the roll O'. The fluted roll P carries a gear-wheel $a$, which meshes with the pinion X. Thus motion is imparted to these several rolls. It will be observed that the speed of the corrugated roll P is less than that of the rolls O and O', which is preferred to properly control the material. From beneath the rolls O and O' a chute $b$ extends, passing angularly around the pulley of the drying-drum, as seen in Fig. 4. This chute delivers the flaked corn and rice into the revolving drum $c$, preferably composed of canvas. The shaft of this drum carries a pulley $d$, and is operated by a belt $e$ from the line-shaft V. The shaft of the drum is inclined, so that the material will automatically feed or flow down the drum. The strips $f'$ of the drum-frame tend to lift the flakes up and carry them over or partially around as the drum rotates slowly. The drum is mounted within a housing $g$, and delivers the dried flakes into the housing between one end and the partition-board $h$, whence the flakes pass off to a suitable point of delivery through a pipe $i$. In the lower part of the housing is located some heating medium, preferably a steam-pipe $j$, connected by a branch pipe $k$ with the steam-supply pipe L. A drip-pipe $l$, having a cock, is used to draw off condensation from the pipe $j$. Another pipe $m$, having a cock and connected with the steam-heating pipe, is used to allow of the escape of steam, so as to create a circulation in the steam-heating pipe. The temperature within the housing $g$ is thus raised and the heat radiated from the heating-pipe passes through the meshes of the canvas and thoroughly heats it and the interior of the drum. In this way the flakes are rapidly dried, while the soft material of the canvas does not tend to abrase them. To facilitate the operation of cooling the product, so that it may be the more readily packed and shipped without delay, I prefer to connect with the discharge-pipe $i$ a fan-blower $o$, operated through a belt $p$ from the line-shaft V. By means of the blast thus created the flakes are rapidly cooled. The sides of the housing may be removed, being preferably made in panels $g'$, as shown in Fig. 3, and held by a suitable latch $h'$.

This apparatus I have tried and found to be practical and well adapted as one means of practicing the process hereinbefore described in the production of my improved combined cereal food.

I do not wish to be understood as saying or in any wise suggesting that this is the only form of apparatus capable of performing this process.

In Letters Patent issued to me May 6, 1890, No. 427,159, for process of manufacturing hominy-flakes or corn-flakes, I show and describe one form of apparatus for practicing the process of that patent; but such apparatus differs in numerous respects from the one herein shown and set forth.

Having thus fully described my invention, what I claim as new, and desire to secure by Letters Patent, is—

1. The herein-described combined cereal food, the same consisting of mixed Indian corn or maize and rice, both reduced to grains and formed into individual flakes and gelatinized by partial cooking.

2. The herein-described combined cereal food, the same consisting of mixed Indian corn or maize and rice, both reduced to grains and formed into individual flakes and gelatinized by partial cooking, the proportion of rice to corn being from one-fourth to one-half.

3. The herein-described process of preparing combined cereal food, the same consisting in reducing Indian corn or maize kernels, in reducing the grains of rice, in mixing the two cereals, in simultaneously subjecting both of them to the action of steam until partially cooked and gelatinized, in then flattening the individual particles to constitute flakes of them, and in then subjecting this gelatinized flake product to a drying action.

4. The herein-described process of preparing combined cereal food, the same consisting in reducing Indian corn or maize kernels to about the size of a half grain of rice, in reducing grains of rice to halves, in mixing the two ingredients so reduced and simultaneously subjecting them to the action of steam until partially cooked and gelatinized, in then forming the individual particles into flakes by means of pressure, and in then subjecting the product to the action of warm air.

In testimony whereof I affix my signature in presence of two witnesses.

JAMES A. CURRIE.

Witnesses:
OLIVER H. MILLER,
WARREN HULL.